United States Patent

[11] 3,583,436

[72] Inventor Leslie C. Chouings
 Leamington Spa, England
[21] Appl. No. 856,778
[22] Filed Sept. 10, 1969
[45] Patented June 8, 1971
[73] Assignee Automotive Products Company Limited
 Leamington Spa, England
[32] Priority Sept. 23, 1968
[33] Great Britain
[31] 45122/68

[54] FLUID PRESSURE VALVE INDICATING MEANS
 9 Claims, 1 Drawing Fig.
[52] U.S. Cl. .................................................. 137/557,
 303/84, 200/82
[51] Int. Cl. ........................................................F16k 37/00,
 H01h 35/38, B60t 15/46
[50] Field of Search............................................. 137/118,
 551, 557; 300/84; 200/82; 340/240, 242, 270

[56] References Cited
 UNITED STATES PATENTS
2,239,348 4/1941 Wirtanen et al. ............... 200/82
2,944,856 7/1960 Swanson........................ 137/557X
3,141,302 7/1964 Reese............................. 303/84X
3,439,323 4/1969 Kersting......................... 340/240X Primary Examiner—Henry T. Klinksiek
Attorney—Lawrence J. Winter ABSTRACT: A valve having two pistons slidable in a through bore and spring loaded apart from each other against stops, an inlet port communicating with the space between the two pistons and passages through the two pistons controlled by nonreturn valves which prevent back flow to the space between the two pistons. A plunger is slidable in a cylinder which is in communication with the space between the two pistons, the plunger carrying the movable contact of an electric switch which operates an alarm device. The arrangement is such that acceptable variations in the pressure of fluid fed to the space between the pistons through the inlet port is compensated for automatically by movement of the pistons to alter the volume of the space and thus maintain the pressure of fluid therein substantially constant, whereas the plunger, which is normally supported by the pressure of fluid within the space between the pistons so as to hold the electric switch open, moves with an unacceptable loss of pressure within the space between the pistons to close the electric switch and operate the alarm device.

PATENTED JUN 8 1971
3,583,436
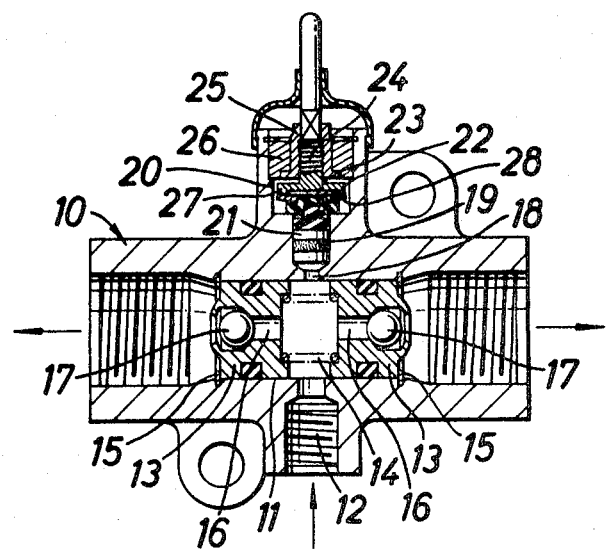
INVENTOR
BY
ATTORNEY

FLUID PRESSURE VALVE INDICATING MEANS

This invention relates to valves for fluid pressure systems.

In fluid pressure systems for operating vehicle brakes and for other purposes it is frequently found desirable, for reasons of safety, to provide two pressure sources separately connected to motor cylinders for operating the same or different brakes or other control devices so that failure of one pipeline or component does not put the whole system out of action. It is usual to employ fluid pressure storage devices as the fluid pressure sources, but to avoid expense and complication it is desirable to use a single-pump or compressor to maintain the stored pressure in both storage devices. By supplying fluid from the pump or compressor to the storage devices through nonreturn valves pressure can be maintained in one of them if the part of the system associated with the other one fails. Furthermore, it is usual to provide an unloader valve in the fluid path between the pump or compressor and the nonreturn valves, the unloader valve being arranged to permit the supply of fluid from the pump or compressor to the storage devices when the pressure in the storage devices is below the desired storage pressure, and to be actuated when the desired stored pressure has been established in the two storage devices to return the fluid output from the pump or compressor to a fluid reservoir from which the pump or compressor draws its supply of fluid. In order to minimize the frequency of actuation of the unloader valve whilst permitting an acceptable amount of fluid leakage from conduit system interconnecting the unloader valve and the nonreturn valve, it is desirable to provide means for compensating automatically for such fluid leakage so as to maintain the fluid pressure within said conduit system at the desired storage pressure when that desired storage pressure is maintained in both storage devices. It is an object of this invention to provide a valve which will control the connection of such an unloader valve to the two storage devices and which affords the desired means for compensating automatically for an acceptable amount of fluid leakage from said conduit system.

According to this invention, a valve device for connecting a fluid pressure generating device to two fluid pressure storage devices comprises a valve body having first and second valve ports interconnected by a valve bore within said valve body, a third valve port which opens into said valve bore between said first and second valve ports, two pistons in said bore urged by spring means against stops which locate them one on either side of said third valve port, passages for the flow of fluid from said third valve port past said pistons to said first and second valve ports and nonreturn valves in said passages to prevent backflow of fluid from said first and second valve ports to said third valve port.

It will be appreciated that a pump or compressor connected to the two storage devices by a valve device in accordance with this invention will no longer supply fluid under pressure to one of the storage devices following failure of part of the system associated with the other storage device so that, although the nonreturn valve controlling communication between the pump or compressor and said one storage device will enable pressure to be maintained in the system associated with said one storage device following failure of the system associated with the other storage device, continued operation of the system will result in the fluid pressure within the system associated with said one storage device falling until the system is wholly inoperative. It is therefore desirable that means shall be provided for giving a warning as soon as the initial failure in the system associated with either one of the storage devices occurs.

According to a feature of this invention the valve device is provided with fluid pressure responsive control means for a warning device, the fluid pressure responsive control means including a plunger slidable in a cylinder connected to said valve bore in substantially the same cross-sectional plane thereof as said third port. A valve device in accordance with this feature of the invention will shut off the connection of the pump or compressor to a failed part of the system and cause simultaneous operation of a warning device.

Preferably said fluid pressure responsive control means includes an electric switch which is spring biased to its closed condition and which is held open by the action on said plunger of fluid under pressure supplied to said valve bore through said third valve port, the arrangement being such that the fluid pressure acting upon said plunger to hold said electric switch open is reduced upon the occurrence of a loss of pressure at one only of said first and second ports so that the electric switch is closed to operate the warning device. Conveniently the body of the valve device affords a fixed contact of the electric switch. The end of the plunger remote from the said valve bore may carry a movable electrical contact which has a greater diameter than the plunger, the movable electrical contact being positioned within a space into which opens the end of the cylinder remote from said valve bore and being movable into engagement with a fixed annular contact surface defined by that part of said valve body which defines a wall of the space which surrounds the cylinder opening. The space may comprise another cylinder having a greater diameter than both the plunger and the movable contact, and resilient means mounted within the other cylinder may be provided to urge the movable contact into engagement with the fixed annular contact surface. The warning device may comprise a light or an audible alarm device.

A passage for the flow of fluid past a piston may be formed in that piston.

One embodiment of this invention will now be described by way of example only with reference to the accompanying drawing which is a longitudinal sectional view of a valve device in accordance with this invention, the valve device being suitable for use in a liquid pressure braking system of a vehicle.

Referring to the drawing, the valve device comprises a body 10 having a through bore 11 and a lateral port 12 leading into the center of the bore 11. Two pistons 13, slidable in the bore 11 and provided with packing rings engaging the wall of the bore 11, are urged by a spring 14 acting between them against stop rings 15 mounted in grooves in the wall of the bore 11 so that they lie normally one on each side of the port 12. Axial passages 16 in the pistons 13 are controlled by nonreturn valves 17 which allow fluid flow through the pistons 13 only from the port 12 to the ends of the bore 11.

Diametrically opposite to the port 12 is an orifice 18 leading into a cylindrical bore 19 which in turn leads into a larger cylindrical bore 20. A plunger 21 slidable in the bore 19 supports, through an electrically insulating plug 22, a disc-shaped electrical contact member 23 within the larger bore 20 spaced from the cylindrical wall thereof. A metal pin 24, screwed into a sleeve 25 located in a ring 26 of electrically insulating material fixed in position in the bore 20, has an enlarged head 27 at its end nearer to the bore 19. A disc spring washer 28 acts between the contact 23 and the head 27 to urge the contact 23 towards an annular contact surface defined by the end of the bore 20 surrounding the opening of the bore 19. The diameter of the contact 23 is greater than that of the bore 19, so that it is able to engage the annular contact surface.

In use of the valve device described above in a liquid pressure braking system of a vehicle the ends of the bore 11 are connected respectively one to each of two liquid pressure accumulators (not shown) and thus to parts of the liquid pressure braking system supplied with liquid pressure by the said accumulators, and the port 12 is connected through an unloader valve (not shown) to a liquid pressure pump (not shown) of the liquid pressure braking system.

The valve body 10 is earthed to the structure of the vehicle on which it is mounted, and the pin 24 is connected through a visual (e.g. an electrically operated light) or audible warning device to one pole of a source of electric current, the other pole of which is also earthed to the vehicle's structure.

Assuming that both parts of the liquid pressure system are liquid-tight, liquid delivered by the pump will be fed to both liquid pressure accumulators, and pressure in the space between the pistons 13 will act on the plunger 21 urging the contact member 23 away from the annular contact surface so that the electrical circuit is open. If the pressure of liquid delivered to the port 12 falls due to an acceptable amount of leakage from the conduit system leading to the port 12, the resultant pressure drop across the two pistons 13 will cause them to move towards each other against the action of the spring 14, thus reducing the volume of the chamber defined between the two pistons 13 and increasing the pressure of liquid therein until the pressures on both sides of the two pistons 13 are balanced again. Thus the valve device provides a means for compensating automatically for an acceptable amount of fluid leakage from the conduit system leading to the port 12 which enables the avoidance of excessive actuation of the unloader valve to supply more liquid to the port 12 to be achieved.

If a leak develops in either one of the liquid pressure accumulators, or in the part of the system connected thereto, so that there is a drop in the liquid pressure at one only of the two ports defined by the end of the bore 11, liquid escapes through the passage 16 in the piston 13 between the port 12 and the end of the bore 11 connected to that accumulator, so that there is a reduction in the liquid pressure between the pistons 13 and so that the pressure in the other accumulator forces the other piston 13 inwardly. There is insufficient pressure now available to support the plunger 21, so that the contact member 23 moves under the influence of the disc spring washer 28 and engages the annular contact surface to close the electrical circuit and operate the alarm by illuminating the light or sounding the audible warning device.

It will be appreciated that the amount by which the piston 13 moves inwardly in the event of such a loss of pressure depends upon the rating of the spring 14. If the spring is loaded sufficiently lightly, the piston 13 will move inwardly by a distance which is sufficient for it to cover the port 12 and the orifice 18 so as to prevent the supply of liquid from the pump to the bore 11, the pump output being returned by the unloading valve to the liquid source. Alternatively if the spring rating is such that spring loading exceeds the loading on the piston 13 due to the different pressure by an amount which is sufficient to prevent the piston 13 from moving inwardly to cover the port 12, it will be appreciated that liquid will continue to be supplied to the bore 11 and thus to the leaking accumulator or associated conduit system.

Whilst the valve device in accordance with this invention has been described with relation to a liquid pressure braking system, it will be understood that it may also be embodied in a compressed air braking system, the pump being replaced by an air compressor and the liquid pressure accumulators by compressed air reservoirs. Alternatively the valve device in accordance with this invention may be embodied in any other fluid pressure control system having a fluid pressure generating device which is to be connected to two fluid pressure storage devices.

I claim:

1. A valve device for connecting a fluid pressure generating device to two fluid pressure storage devices, comprising a valve body having first and second valve ports interconnected by a valve bore within said valve body, a third valve port which opens into said valve bore between said first and second valve ports, two pistons in said bore urged by spring means against stops which locate them one either side of said third valve port, passages for the flow of fluid from said third valve port past said pistons to said first and second valve ports, and non-return valves in said passages to prevent backflow of fluid from said first and second valve ports to said third valve port.

2. A valve device as claimed in claim 1, having fluid pressure responsive control means for a warning device, the fluid pressure responsive control means including a plunger slidable in a cylinder connected to said valve bore in substantially the same cross-sectional plane thereof as said third port.

3. A valve device as claimed in claim 2, wherein said fluid pressure responsive means includes an electric switch which is spring-biased to its closed condition and which is arranged to be held open by the action on said plunger of fluid under pressure supplied to said valve bore through said third valve port, the arrangement being such that the fluid pressure acting upon said plunger to hold said electric switch open is reduced upon the occurrence of a loss of pressure at one only of said first and second ports so that the electric switch is closed to operate the warning device.

4. A valve device as claimed in claim 3, wherein said valve body affords a fixed contact of the electric switch.

5. A valve device as claimed in claim 4, wherein the end of the plunger remote from said valve bore carries a movable electrical contact which has a greater diameter than the plunger, the movable electrical contact being positioned within a space into which opens the end of the cylinder remote from said valve bore and being movable into engagement with a fixed annular contact surface defined by that part of said valve body which defines a wall of the space and surrounds the cylinder opening.

6. A valve device as claimed in claim 5, wherein the space comprises another cylinder having a greater diameter than both the plunger and the movable electrical contact, and including resilient means mounted within the other cylinder, the resilient means urging the movable electrical contact into engagement with the fixed annular contact surface.

7. A valve device according to claim 2, wherein the warning device comprises a light.

8. A valve device according to claim 2, wherein the warning device comprises an audible alarm device.

9. A valve device according to claim 1, wherein a passage for the flow of fluid past a piston is formed in that piston.